June 27, 1939. J. C. RYAN 2,163,890
NONSKID DEVICE FOR AUTOMOBILE TIRES
Filed Dec. 14, 1937

Inventor.
John C. Ryan.

Patented June 27, 1939

2,163,890

UNITED STATES PATENT OFFICE 2,163,890

NONSKID DEVICE FOR AUTOMOBILE TIRES

John C. Ryan, Toronto, Ontario, Canada, assignor of one-third to Russell Bowlby and one-third to Charles B. Lewis, both of Toronto, Ontario, Canada Application December 14, 1937, Serial No. 179,732

4 Claims. (Cl. 152—221)

The principal objects of this invention are to provide an attachment for automobile tires which will present a non-skid surface for contact with the road to prevent side slipping and to materially increase traction on slippery pavements.

A further object is to provide a non-skid device which will not injure the tires or road surface and will have remarkable wearing qualities and may be easily and quickly attached or detached.

The principal feature of the invention consists in the novel formation of a flexible pad adapted to fit snugly to the tire surface having a rubber surface presenting side ribs extending circumferentially of the tire to grip the road against side slip and transverse ribs enclosing areas which form "vacuum" spaces and enhance traction with the road surface.

In the accompanying drawing Figure 1 is a bottom plan view of the traction portion of my improved non-skid device.

Figure 1:
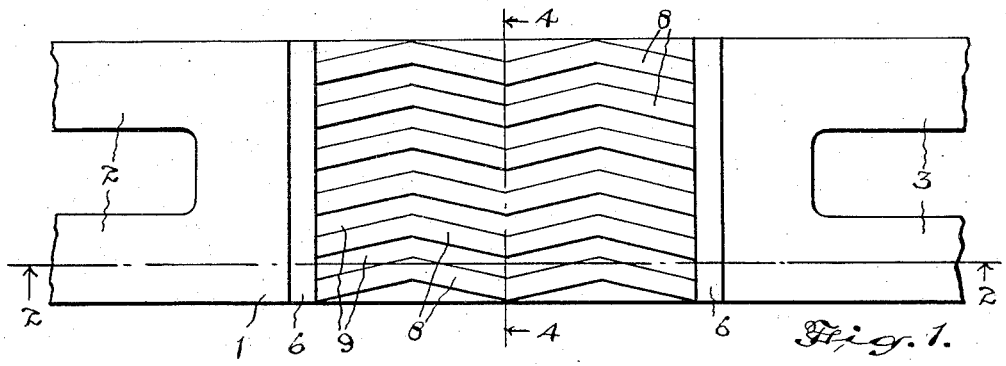
Figure 2:
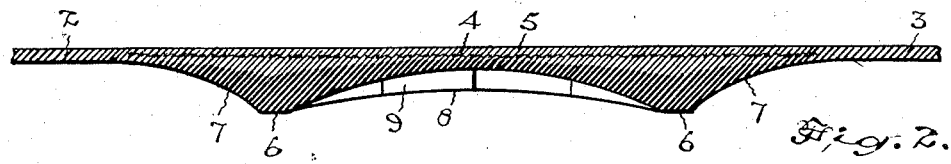
Figure 2 is a longitudinal sectional view through the device taken on the line 2—2 of Figure 1.
Figure 3:
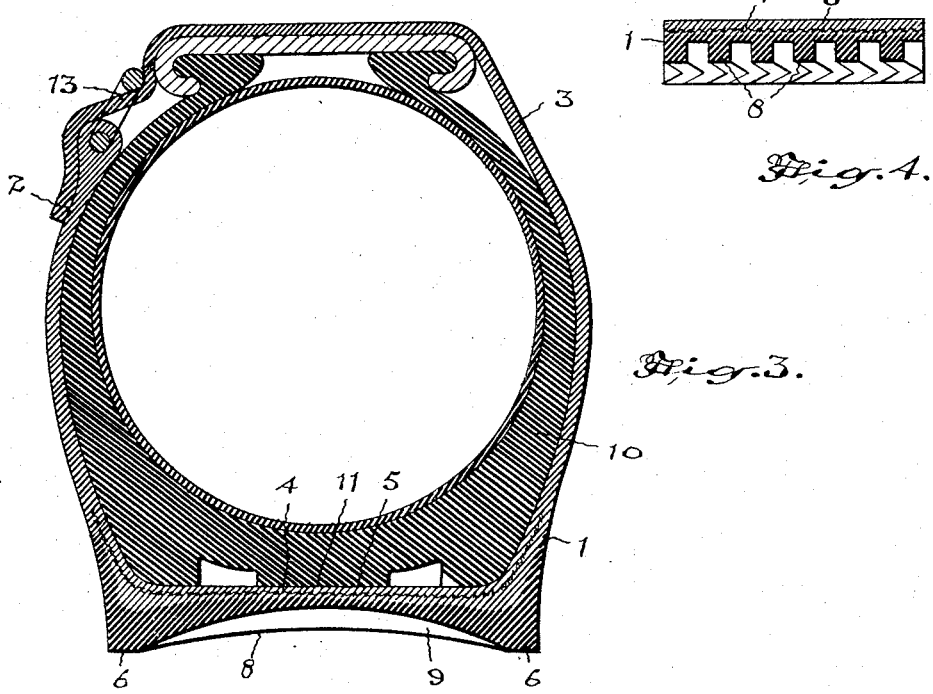
Figure 3 is a part cross sectional view of an automobile tire showing my device arranged in operative position thereon.
Figure 4:
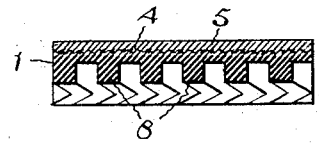

Fgure 4 is a transverse section taken on the line 4—4 of Figure 1.

Figure 5:
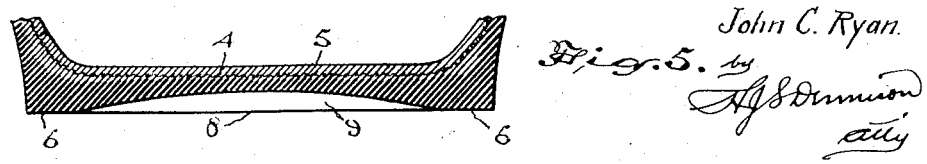

Figure 5 is a cross sectional view of the device illustrating its shape as deformed under load.

Many forms of traction or anti-skid devices have been proposed for use on automobile tires in an effort to avoid the dangers of skidding on slippery pavements and the most commonly used is that formed of metal chains stretched transversely of the tire. These, though apparently the best that have been produced have many detrimental defects. They present at best only narrow cross bands of chain links which roll from under the tire surface when brakes are applied and they are extremely noisy and wear very rapidly.

It is the purpose of this invention to provide an extensive gripping surface which will withstand wear to a remarkable degree and will effectively grip the road surface for forward traction and to resist side slipping.

The device as herein shown comprises a pad 1, preferably of rectangular form having extension straps 2 and 3 extending from opposite ends thereof to encircle the tire and rim of an automobile wheel. This pad and straps are built up of a suitable strong textile fabric 4 such as heavy duck embedded in a body of strong durable rubber 5.

One face of the pad has built thereon a structure of rubber, preferably of a hard tough nature, such as the stock used on tire treads and comprises heavy ribs 6, which are formed with outwardly bevelled sides 7 tapering into the rubber cover of the strap fabric.

A plurality of arched ribs 8 extend transversely between the ribs 6, forming a plurality of spaced recesses 9 which are closed at the ends by the ribs 6.

When the flexible pad is applied to the tire 10 which usually has a more or less transversely flattened tread 11, the strap ends 2 and 3 extend upwardly around the tire and are secured by suitable buckles 13.

The tightening of the straps 2 and 3 draws the bevelled portions 7 toward the more or less circular form of the tire so that the ribs 6 present sharp side edges to grip into snow or icy road surfaces thereby presenting a strong side grip to prevent side skidding of the tire.

The transverse arched ribs 8 are partly straightened out lengthwise as also are the recesses 9 therebetween and when the weight of the automobile comes upon the device in the rotation of the wheel, the side ribs spread outwardly and the transverse ribs are compressed reducing the volumetric dimensions of the recesses 9 and effectively squeezing out the air which normally fills them.

The ultimate result of the rolling contact of the cross ribbed pad is that the air is expelled from the recesses 9 and as the wheel turns and the rubber expands under the progressive relief of the compression pressure against the road surface as illustrated in Figure 5, a vacuum is created and the device has a strong tendency to adhere to the road. Wet, slippery pavements enhance this action by presenting a seal between the rubber and the road surface and the device grips the road and very effectively prevents slipping of the contacting surfaces.

It will also be understood that the cross ribs 8 which form the successively sealing walls of the vacuum areas as the wheel rolls in contact with the road surface, form effective gripping contacts with such surface for forward traction while the side ribs 6 and the suction effect, prevent side slip.

A device such as described will not tear or injure the tire and being constructed of the same materials as the tire, it will readily flex with the tire and retain its position thereon. Further it will be quite noiseless and will not grind or wear except in a similar manner to the wear of tires. Consequently the device may be placed on a tire and kept there during uncertain weather without the inconvenience and discomfort experienced in the frequent removing and replacing of chains.

This device has been described as an attachment for tires, but it will be readily understood that the structure described may be directly applied to the tire tread and to extend completely around its periphery.

What I claim as my invention is:

1. A non-skid pad for attachment to an automobile tire, said pad being of tough rubber composition and having a local tread-forming area presenting a base portion progressively increasing in depth in opposite directions from a central region to present a deeply concaved surface on the tread side terminating in prominent shoulder formations of substantial apexed form, said deeply concaved area being subdivided by cross ribs which bridge and progressively merge with said shoulders and increase in depth in opposite directions toward said central area, said ribs presenting concaved tread surfaces of lesser concavity than said base area, said apexed shoulders being of massive cross-sectional area relative to that of said cross ribs and adapted to sustain the major load.

2. A non-skid pad for attachment to automobile tires having resilient transverse traction ribs of crescent formation with the concave side representing the tread face whereby the central portion will be of greatest depth.

3. A non-skid pad for attachment to automobile tires having resilient transverse traction ribs presenting their greatest tread depth substantially centrally of their length, and means for concentrating the forces of compression at the outer ends thereof.

4. A non-skid pad for attachment to automobile tires having resilient transverse traction ribs presenting their greatest tread depth substantially centrally of their length, and resilient portions surmounting said ribs and adapted to relieve the ribs of the major load and to yield under pressure to permit the ribs to contact the road surface under less compression stress than the said resilient portions.

JOHN C. RYAN.